March 12, 1940.　　　F. NEUMANN　　　2,193,072
EEL BASKET
Filed May 7, 1938
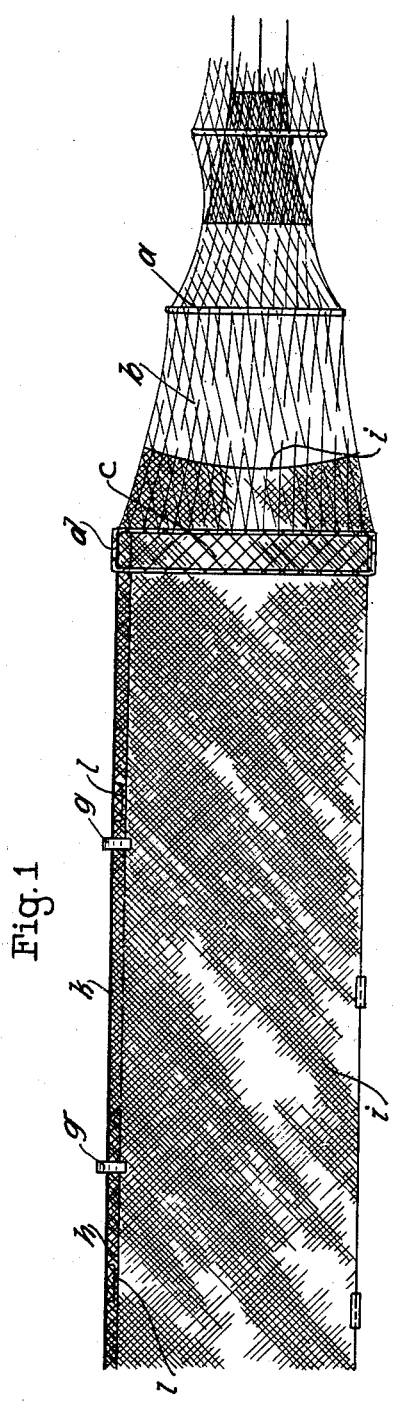
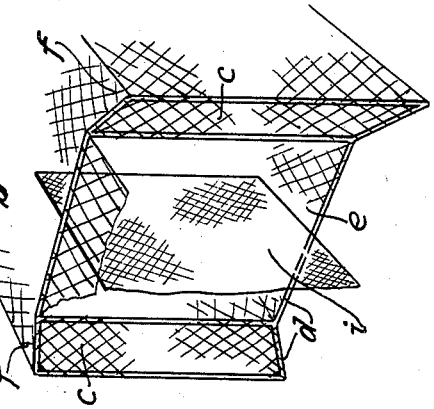
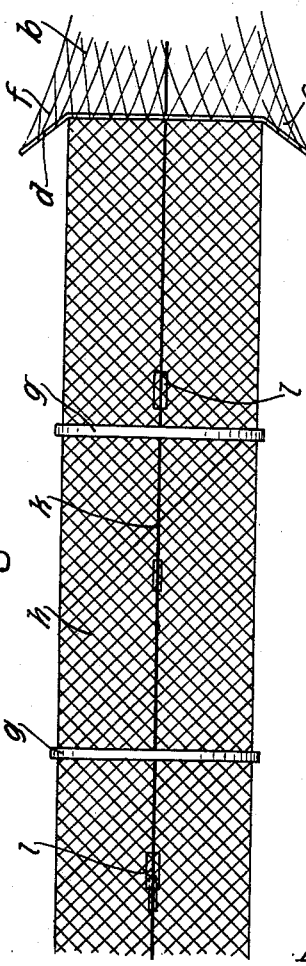
Inventor:
Friedrich Neumann Patented Mar. 12, 1940

2,193,072

UNITED STATES PATENT OFFICE 2,193,072

EEL BASKET

Friedrich Neumann, Eckernforde-on-the-Baltic, Germany

Application May 7, 1938, Serial No. 206,546
In Germany May 12, 1937

4 Claims. (Cl. 43—100)

This invention relates to an improved construction of the known pots or baskets especially for catching eels.

The known baskets used for catching eels use for obtaining large catches a guide net which extends from the basket mouth to the anchorage of the basket or to an opposite basket. This guide net is arranged in the middle of the basket mouth, in some instances also on the two sides thereof and is intended to guide the fish along the guide net to the mouth of the basket. The guide nets are mostly set, according to the position of the basket, by poles pushed into the bed of the body of water or by some other means. It has been found that the baskets and guide nets thus laid do not lead to catches as large as might be expected. This is due to the fact that some of the fish slip over the guide net and thus reach the open water, or when actually led up to the basket mouth turn aside just before they reach the mouth and pass into the open water. In this way a large portion of the catch is lost to the fishermen and the market.

This objection is overcome according to the invention in an advantageous manner in that the basket has a basket fore-chamber with lateral pockets and connected to a roof net arranged over the guide net. The basket fore-chamber is preferably formed by connecting by means of nets the gasket mouth with a frame bent in the form of a shield and covered with a net in such a manner as to leave an aperture of approximately the same size as the basket mouth. In another form of construction according to the invention a roof net covering the guide net in longitudinal direction is arranged on the upwardly directed side of the frame.

By this advantageous construction of the eel basket the fish are prevented from jumping over the guide net on the one hand and on the other hand the fish which have entered the basket mouth are already in the fore-chamber of the basket from which escape is difficult owing to the lateral pockets.

Especially, for catching eels which are known to climb over obstacles out of the water and in the case of ordinary baskets often avoid these, a much better catch is obtained with the basket according to the invention. Furthermore, the basket yields good catches with all other kinds of fish. The basket can be used in waters in which the use of ordinary baskets presents great difficulties.

An embodiment of the invention is illustrated by way of example in the accompanying drawing, in which:

Fig. 1 shows the eel basket in side elevation.

Fig. 2 is a top plan view of Fig. 1,

Fig. 3 is a perspective view of the front end of the eel basket.

The eel basket $a$ constructed in known shape is extended by a netting to form a basket fore-chamber $b$ which on the side remote from the basket mouth is connected to a frame $d$ over which a net $c$ is stretched. The net $c$ of the frame $d$ leaves free an opening $e$ corresponding in size to the basket mouth. The frame $d$ has forwardly bent lateral portions over which the netting is stretched to form forwardly tapering wedge shaped pockets $f$ which render it difficult for eels and fish to escape from the fore-chamber. A roof net $h$ stretched by several holding straps $g$ is secured to the upper edge of the frame $d$ and covers the entire length of a guide net $i$ arranged in the middle of the entrance aperture of the fore-chamber. The roof net $h$ is of a width corresponding to the width of the fore-chamber aperture. One end of the guide net $i$ extends into the fore-chamber $b$ where it is secured to the netting, whereas its other end is attached with the roof net $h$ in known manner to a pole or the like rammed in the body of water. The roof net $h$ may be slightly curved or made in wedge shape so as to increase its guiding capacity and connected with the guide net $i$ or with the holding rope $k$ of the same. The rope $k$ has floats $l$ which support the guide net $i$ and the roof net $h$ in the water.

It is evident that, besides the guide net $i$, lateral guide wings may also be provided one on each side of the basket fore-chamber and connected therewith. The roof net $h$ may be of different shapes and widths to that shown.

I claim:

1. An eel basket arrangement, comprising in combination an eel basket having a mouth, a fore-chamber at the mouth of said basket, lateral pockets in said fore-chamber, a guide net extending from the mouth of said fore-chamber, and a roof net covering said guide net and connected to said fore-chamber.

2. An eel basket arrangement as specified in claim 1, in which the roof net is of a width approximately corresponding to the width of the entrance to the basket fore-chamber.

3. An eel basket arrangement as specified in claim 1, in which the roof net covers the guide net along its entire length.

4. An eel basket arrangement as specified in claim 1, in which the roof net and the guide net are rigidly connected, and a carrying rope supports said guide net and said roof net and holds them in position.

FRIEDRICH NEUMANN.